United States Patent Office 3,740,375
Patented June 19, 1973

3,740,375
CROSS-LINKABLE CHLORINATED AROMATIC POLYMERS
Ernest Richard Novak, Wilmington, Del., assignor to E. I. du Pont de Nemours and Company, Wilmington, Del.
No Drawing. Filed July 1, 1971, Ser. No. 158,994
Int. Cl. C08g 25/00, 23/00
U.S. Cl. 260—61       11 Claims

ABSTRACT OF THE DISCLOSURE

A cross-linkable, shapeable polymeric composition comprising the groups (—Ar—)$_x$ and (—A—Ar'—A—)$_y$ in substantially alternating sequence and a group (—A—Ar'—AH)$_z$ capable of cross-linking polymer chains through their —Ar— moieties, wherein —A— is —O— or —S—, —Ar— is a divalent perchlorinated aromatic group of 10–24 aromatic carbon atoms —Ar'— is a divalent aromatic group of 6 to 24 aromatic carbon atoms; the groups being present in amounts such that $$\frac{y+z}{x}$$

is in the range of 1.01 to 1.6, the polymer having an inherent viscosity of at least 0.2. A process of preparing the above described polymers by reacting a compound of the formula Cl—ArCl with a 1.01 to 1.0 molar amount of a compound of the formula HA—Ar'—AH at from 25 to 250° C. in the liquid phase and preferably in a solvent for one or both of the monomers.

BACKGROUND OF THE INVENTION

Aromatic polyethers such as those described in British Pat. No. 1,078,234 and Belgian Pat. No. 687,344 have suffered from a lack of oxidative stability and flame resistance. A polyphenyl ether-sulfone derived from hexachlorobenzene and having good flame resistance is described in U.S. Pat. 3,532,670. Aromatic polyethers derived from substantially equimolar quantities of perchlorinated aromatic compounds and the appropriate aromatic diols or dithiols and having improved oxidative and flame resistance while retaining excellent high temperature mechanical characteristics are described in copending application Ser. No. 41,063 filed May 27, 1970 by Ernest R. Novak now abandoned.

For some end uses, resistance to solvents as well as the desirable properties enumerated above is required. A cross-linked polycondensation product of hexachlorobenzene and a double molar quantity of bisphenol A, which is insoluble in methylene chloride, is described in British Patent No. 1,174,954. Such a product, while resistant to solvents, is not amendable to normal shaping techniques.

Reaction of a perhalogenated compound with an alkali-metal phenate to produce low molecular weight products is described in Belgian Pat. No. 748,698.

SUMMARY OF THE INVENTION

The present invention relates to cross-linkable polymers containing certain perchlorinated aromatic units. These polymers which are polyethers or polythioethers comprise the groups (—Ar—)$_x$ and (—A—Ar'—A—)$_y$ in substantially alternating sequence and a group (—A—Ar'—AH)$_z$ capable of cross-linking. In this definition, —A— is —O— or —S—, —Ar— is a perchlorinated divalent aromatic group containing from 10 to 24 aromatic carbon atoms, having at least two aromatic rings, and wherein any bridges between aromatic nuclei are of not more than one atom, —Ar'— is a divalent group containing from 6 to 24 aromatic carbon atoms wherein any bridges between aromatic nuclei are not more than one atom. The cross-linkable group (—A—Ar'—AH)$_z$ is attached to the —Ar— moiety of the polymer chain, in place of at least one chlorine atom of the moiety. The groups (—Ar—)$_x$, (—A—Ar'—A—)$_y$ and (—A—Ar'—AH)$_z$ are present in such amounts that $$\frac{y+z}{x}$$

is in the range of 1.01 to about 1.6. The sum of $x+y+z$ is generally above 20. End groups of a given polymer chain can be —A—Ar'—AH, H, or M where M is an alkali metal, alkaline earth metal or quaternary ammonium ion, and preferably sodium or potassium. These polymers can be cross-linked by heating at a temperature in the range of 300–450° C. for a period of about 2 minutes to about 30 minutes.

The polymers of this invention have an inherent viscosity of at least 0.2, preferably 0.3, as measured from a solution of 0.5 g. of the polymer in 100 ml. of solvent at a temperature in the range of 30–35° C. Suitable solvents for this purpose include benzene, chlorobenzene, tetrahydrofuran, perchloroethylene, dimethylacetamide and hexamethylphosphoramide, or mixtures of these.

As used herein aromatic group includes benzene based groups such as phenylene, biphenylene, triphenylene, tetraphenylene and condensed benzene ring groups such as naphthylene, or phenanthrylene. This language is not intended herein to include heterocyclic groups. By a "bridge of not more than one atom" is meant the means of direct bonding between rings. In the case of bonding through one atom, other atoms may be attached to the bridging atom. Thus,

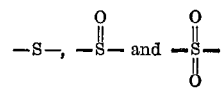

are included but

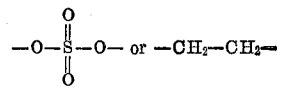

is excluded by this definition.

Preferred —Ar— groups are selected from the class consisting of

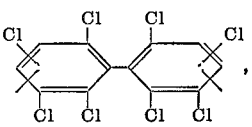

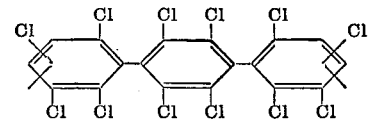

and

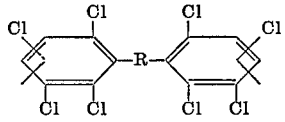

wherein R has the meaning defined below.

Preferred —Ar'— groups are selected from the class consisting of

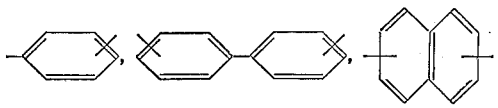

and

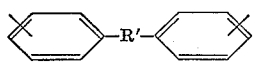

The bridge —R— is selected from the class consisting of

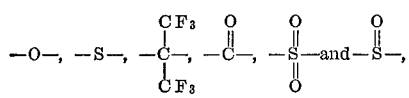

and the bridge R' is selected from the class consisting of R and

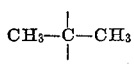

These polymers are prepared by reacting the perchlorinated compound of the formula Cl—Ar—Cl with a molar excess in the range of 1.0 to about 60 mole percent preferably 2 to 25 mole percent, of at least one compound of the formula H—A—Ar'—A—H wherein —A— is oxygen or sulfur and —Ar— and —Ar'— have the meanings defined above, at from 25 to 250° C. in the presence of a base. In carrying out this reaction the chlorine atoms in the Cl—Ar—Cl are displaced from perchlorinated nuclei to form a polymer containing substantially alternating units —Ar— and —A—Ar'—A— with the cross-linkable units —A—Ar'—OH being attached to particular —Ar— moieties along the polymer chain, replacing a chlorine atom. In carrying out the preparations, pressure is not an important variable and any pressure sufficient to maintain the monomers in the liquid state at the temperature being used is satisfactory.

The process is preferably carried out in a solvent for at least one and preferably both of the monomers. Generally, concentrations of 10 to 300 and preferably from 50 to 250 grams of monomer per liter of solvent are satisfactory. Suitable solvents include dimethylacetamide, dimethylformamide, dimethylsulfoxide, tetramethylenesulfone, and hexamethylphosphoramide which may be used alone or in combination with a compound such as benzene, toluene, or a partly chlorinated aromatic compound.

Suitable bases for use in the present process are alkali metal, alkaline earth or quaternary ammonium salts of weak acids. Typical bases include potassium carbonate, sodium carbonate, magnesium oxide, sodium hydroxide and calcium hydroxide.

The polymers of this invention include in general those derived from reaction of perchlorinated monomers such as perchlorobiphenyl, perchlorodiphenyl ethers, perchlorodiphenyl sulfide, perchloro-p-terphenyl or perchloronaphthalene with dihydride phenol monomers such as 2,2-bis(p-hydroxyphenyl)propane (bisphenol A), hydroquinone, resorcinol, p,p'-biphenol, 4,4'-dihydroxybenzophenone or 4,4'-dihydroxydiphenyl sulfone. Illustrative polymers include those made by reaction of the following combinations:

perchlorobiphenyl with 2,2-bis(p-hydroxyphenyl)propane;
perchlorobiphenyl with hydroquinone;
perchlorobiphenyl with

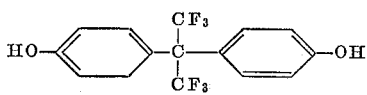

perchlorobiphenyl with 4,4'-dihydroxydiphenyl sulfone;
perchlorobiphenyl with resorcinol;
perchlorodiphenyl ether with 2,2-di(p-hydroxyphenyl)propane;
perchlorobiphenyl with 4,4'-dihydroxybenzophenone;
perchlorobiphenyl with hydroquinone and resorcinol;
perchlorodiphenyl sulfide with 2,2-di(p-hydroxyphenyl)propane;
perchloro-p-terphenyl with 2,2-di(p-hydroxyphenyl)propane.

The term "cross-linkable" is intended to mean that at this stage the polymers are substantially free of cross-linking, that they are soluble in appropriate organic solvents such as benzene, toluene, the xylenes, chlorobenzene and perchloroethylene and that they can be cross-linked by appropriate treatment.

The term "shapeable" is intended to mean that the polymeric composition can be shaped into useful structures by extrusion through dies, melt pressing into forms, casting as films, coating on substrates or by similar processing.

The term "cross-linked" is intended to mean that a polymer chain is covalently linked to at least one other polymer chain by at least one covalent linking group containing at least one —A—Ar'—A— moiety.

The cross-linkable polymers of this invention can be formed into useful shapes by melt processing or by direct forming and sintering of powders at a temperature of 300–450° C., during which cross-linking occurs. They can be applied to various substrates such as metals or ceramics from solution in an organic solvent and thereafter baked at the appropriate temperature to effect cross-linking.

The cross-linked polymers provide a combination of excellent thermal stability, high softening temperatures and outstanding solvent resistance. In addition, the polymers of the present invention have a low flammability and generally exhibit a limiting oxygen index of above 0.4 and preferably above 0.6 as measured by Oxygen Index Flammability Test, Jack L. Isaacs, reported in 27th Annual Technical Conference S.P.E. Papers, vol. XV, 143–147. Areas of application include use as insulation in electrical equipment and appliances, as coatings for cookware, and as self-supporting structures such as sheets, films, tubes and other desired shapes. They are useful alone or in combination with suitable fillers such as refractory oxides or particulate metals or as binders in friction compositions.

DESCRIPTION OF THE PREFERRED EMBODIMENTS

Example 1

Polymer from perchlorobiphenyl and 2,2-bis(p-hydroxyphenyl)propane.

A 1 liter, 4-neck flask, equipped with $N_2$ purge, mechanical stirrer, thermometer, heating mantle and a chlorobenzene-water separator trap, was charged with 75.0032 g. perchlorobiphenyl, 38.0023 g. 2,2-di(p-hydroxyphenyl)propane (8% molar excess), 300 ml. chlorobenzene, and 300 ml. dimethylacetamide. This was heated to about 140° C. and 34 g. ground anhydrous $K_2CO_3$ was added. The temperature was raised to reflux of 145° C. as measured in the reaction mixture. During the polymerization 130 ml. of organic phase and a small amount of water was drained from the trap, and 50 ml. of chlorobenzene was added back to the pot. At the end of the reaction the temperature in the mixture increased to 149° C. Heating was discontinued 55 minutes after the addition of $K_2CO_3$. To facilitate filtration, 125 ml. chlorobenzene was added. After filtration, the filtrate was added to methanol. The precipitated polymer was collected by filtration and washed with more methanol. The polymer had an inherent viscosity of 0.66 as measured in benzene in 0.5% solution at 35° C.

The polymer is believed to comprise the units:

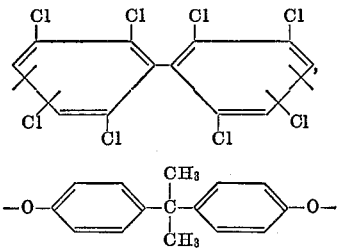

and

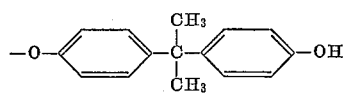

where E is Cl or a side chain terminating with the unit

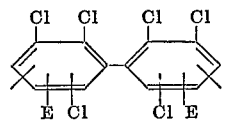

The polymer was compression molded at 400° C. for 10 minutes. A slightly discolored film was obtained. This film had the following properties:

Tensile strength _____ p.s.i__ 7,400
Tensile modulus _____ p.s.i__ 241,500
Ultimate elongation _____ percent__ 1.5

Compression molded pieces softened but were no longer soluble in benzene.

Example 2.—Polymer from perchlorobiphenyl and hydroquinone

A 3 liter, 4-neck flask, equipped with $N_2$ purge mechanical stirrer, thermometer, heating mantle and a distilling column, was charged with 200.0 g. of perchlorobiphenyl, 48 g. of hydroquinone (molar excess—9%), 800 ml. of dimethylacetamide and 1200 ml. of chlorobenzene. The contents of the flask were heated to 130° C. and 90 g. of ground, anhydrous potassium carbonate was added. During the polymerization the temperature of the reaction mixture (Pot temp.), temperature at the top of the distilling column (Head temp.) volume of distillate (Dist.), further additions to the flask (Additions) and changes in viscosity (Efflux time) were observed. Change in viscosity was determined by withdrawing a 20 ml. sample of the reaction mixture and filtering to remove insolubles and measuring the efflux time of a 10 ml. sample of the filtrate through a No. 300 Canon-Fenske viscometer tube maintained at 35° C.

As will be seen in the reaction summary shown below, temperature of the reaction mixture was lowered as the polymerization proceeded, which facilitates control to prevent undesired gelation toward the end of the run. The reaction profile is summarized below.

| Time, minutes | Pot temperature, °C. | Head temperature, °C. | Distillate, ml. | Additions | Efflux time, minutes |
|---|---|---|---|---|---|
| 0 | 130 | 28 | | $K_2CO_3$ | |
| 52 | 137 | 128 | 30 | | |
| 60 | 137 | 118 | 60 | | |
| 75 | 137 | 121 | 88 | | |
| 103 | 140 | 128 | 160 | | |
| 167 | 140 | 128 | 245 | | |
| 183 | 141 | 127 | 273 | $C_6H_5Cl$-300 ml. | |
| 195 | 140 | 128 | 290 | | 0.22 |
| 247 | 140 | 132 | 305 | | |
| 280 | 130 | 40 | 325 | $C_6H_5Cl$-30 ml. | .50 |
| 365 | 112 | 29 | 325 | | .76 |
| 395 | 109 | 28 | 325 | | .98 |
| 455 | 109 | 28 | 325 | | 1.36 |
| 480 | 109 | 28 | 325 | | 1.58 |
| 490 | 108 | 28 | 325 | | 1.70 |
| 496 | 108 | 29 | 325 | | 2.05 |

The polymer, isolated as described in Example 1, had an inherent viscosity of 0.4, measured as described in Example 1. It is believed to comprise the units:

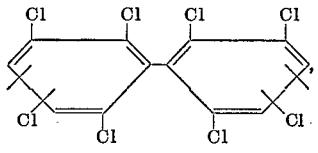

and

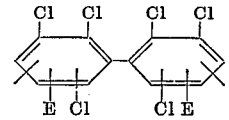

where E is Cl or a side chain terminating with the unit

—O—⟨⟩—OH

Examples 3–7.—Polymers from perchlorobiphenyl, and hydroquinone

The polymerization of Examples 4, 5 and 6 were carried out as described in Example 1. For these examples 200 ml. of dimethylacetamide and about 225 ml. of chlorobenzene were charged for each 50 g. of perchlorobiphenyl and about 20 g. of anhydrous potassium carbonate for each 11 g. of hydroquinone.

The polymerizations of Examples 3 and 7 were carried out following the procedure of Example 2 except that in Example 7 the charge of potassium carbonate was 120 g. The polymers of Examples 3, 4, 5 and 7 were isolated as described in Example 1, using methanol as precipitant. The polymer of Example 6 was stirred with water to remove inorganics, and the organic phase added to rapidly stirred methanol to isolate the polymer. The results are tabulated below:

| Example | PCBP, grams | HQ grams | HQ molar excess, percent | Polymerization time, minutes | Inherent viscosity |
|---|---|---|---|---|---|
| 3 | 200.0 | 44.53 | 1.0 | 765 | 0.28 |
| 4 | 150.0 | 34.5606 | 4.4 | 57 | 0.26 |
| 5 | 150.0 | 34.5616 | 4.4 | 59 | 0.28 |
| 6 | 150.0 | 34.5627 | 4.4 | 61 | 0.59 |
| 7 | 200.0 | 66.00 | 50.0 | 705 | 0.22 |

The products of all the examples were soluble in benzene and gave benzene-insoluble films when compression molded at temperatures of about 350° C. for 6 to 10 minutes. The mechanical properties of a thin film molded from the product of Example 5 were as follows: tensile modulus 412,000 p.s.i., tensile strength 8,400 p.s.i., ultimate elongation 2.0%.

Alternate polymerization method—delayed addition of excess dihydric compound: In the preceding examples all of the ingredients except potassium carbonate were charged at the outset. Optionally the preparation can be carried out as illustrated in Examples 8 and 9 by first charging substantially equimolar quantities of the perchlorinated and dihydric components and later adding to the reaction mixture the desired excess of the dihydric material. If desired, the product resulting from the reaction of equimolar quantities of the two components can be isolated and subsequently further reacted with excess dihydric component, as illustrated in Example 10.

Example 8

The polymerization of this example was carried out in a one-liter flask equipped as in Example 1. The flask was charged with substantially equimolar quantities of perchlorobiphenyl (76.0405 g.) and hydroquinone (16.5160 g.), 300 ml. of dimethylacetamide and 375 ml. of chlorobenzene.

When the temperature in the flask reached 135° C., 35 g. of anhydrous potassium carbonate was added. The polymerization was run for 62 minutes at 141–143° C., during which time 140 ml. of distillate was removed and 80 ml. of chlorobenzene was added to the flask. Thereafter, 1.7 g. of hydroquinone (molar excess—8%) and 30 ml. of chlorobenzene were introduced into the flask, and the polymerization was continued for 21 minutes longer. The polymer, isolated as in Example 1, had an inherent viscosity of 0.60.

Example 9

A 2-liter flask equipped as in Example 1 was charged with 150.0 g. of perchlorobiphenyl, 32.9044 g. of hydroquinone, 600 ml. of dimethylacetamide and 700 ml. of chlorobenzene. When the temperature in the flask reached 142° C., 60 g. of anhydrous potassium carbonate was added. Polymerization was carried on at 140–143° C. for 50 minutes during which time 175 ml. of distillate was collected and 90 ml. of chlorobenzene was added to the flask.

At this time 3.4241 g. of hydroquinone (molar excess—10%), 30 ml. of chlorobenzene and 10 g. of potassium carbonate were added to the flask, followed by an additional 30 ml. of chlorobenzene 8 minutes later. After a further 22 minutes the polymerization was stopped, the mixture filtered and approximately one-half of the filtrate was stirred for 20 minutes with a solution of 12 g. of potassium hydroxide in 60 ml. of water, after which the polymer was isolated as described in Example 1.

Tensile bars were formed from the isolated powder by pressing at 100,000 p.s.i. at room temperature. The resulting bars were sintered under nitrogen at 325° C. for 4 hours and one hour at 350° C. The sintered bars showed a tensile strength of 5,600 p.s.i., tensile modulus of 260,000 p.s.i. and ultimate elongation of 4%.

Example 10

Sixty-five grams of a thermoplastic polyether having an inherent viscosity of 0.32 and prepared from 2,2-di(p-hydroxyphenyl)propane (bisphenol A) and a 1.86 mole percent excess of perchlorobiphenyl, as described in Example 9 of U.S. Ser. No. 41,063 referred to above, was dissolved in a mixture of 200 ml. of dimethylacetamide and 300 ml. of chlorobenzene. The solution was heated to 141° C. and 2.5 g. of bisphenol A (11 mole percent excess based on perchlorobiphenyl) and 3.0 g. of anhydrous potassium carbonate were added.

The reaction thereafter was carried out as described in Example 2 over a period of 248 minutes. The reaction mixture was filtered and the filtrate was found to have an efflux time of 1.94 minutes. The polymer, isolated as in Example 1, had an inherent viscosity of 0.40, measured as described in Example 1. On compression molding the polymer at 400° C. for 25 minutes a film is obtained which is no longer soluble in the dimethylacetamide/chlorobenzene solvent mixture described above.

Example 11.—Coating on substrates

A polymer made from 50.0030 g. of perchlorobiphenyl and 12.5127 g. of hydroquinone (molar excess—11.3%) prepared as described in Example 1 and having an inherent viscosity of 0.51, as measured in Example 1, was applied in toluene solution (about 12% solids at room temperature) to several aluminum substrates including a fry pan and a baking pan. The coated utensils were heated at about 205° C. for 10 minutes to remove solvent and were thereafter baked at 315° C. to 400° C. for 15 minutes to cross-link the polymer coating. Thereafter the fry pan was used for cooking a meat loaf and muffins were baked in the baking pan. At the end of the cooking and baking cycles the coated utensils showed excellent release of the foodstuff; on inverting the utensil the foodstuff dislodged cleanly. Similar results were obtained with similarly coated glass cookware.

The cross-linkable polymers can also be applied to substrates by melt coating, or by laminating as well as by solution coating as, for example, in the preparation of printed circuit boards.

I claim:

1. A cross-linkable, shapeable polymeric composition with a polymer chain consisting essentially of the groups (—Ar—)$_x$ and (—A—Ar′—A—)$_y$ in substantially alternating sequence and a group (—A—Ar′—AH)$_z$ attached to an —Ar— group by replacement of at least one chlorine atom of the —Ar— moiety and capable of cross-linking multiple polymer chains through their respective —Ar— moieties; wherein —A— is selected from the class consisting of —O— and —S—, —Ar— is a perchlorinated divalent aromatic group containing from 10 to 24 aromatic carbon atoms having at least two aromatic rings and wherein any bridges between aromatic nuclei are of not more than one atom, and wherein —Ar′— is at least one divalent group containing from 6 to 24 aromatic carbon atoms wherein any bridges between aromatic nuclei are not more than one atom; wherein the groups (—Ar—)$_x$, (—A—Ar′—A—)$_y$ and (—A—Ar′—AH)$_z$ are present in such amounts that $$\frac{y+z}{x}$$

is in the range of 1.01 to about 1.6; wherein the polymeric composition has an inherent viscosity of at least 0.2 as measured from a solution of 0.5 g. of polymer in 100 ml. of a solvent selected from at least one of the groups consisting of benzene, chlorobenzene, tetrahydrofuran, perchloroethylene, dimethylacetamide, and hexamethylphosphoramide at a temperature in the range of 30° C. to 35° C.

2. The polymer of claim 1 wherein $$\frac{y+z}{x}$$

is in the range of 1.02 to 1.15.

3. The polymer of claim 1 wherein —Ar— is selected from the class consisting of

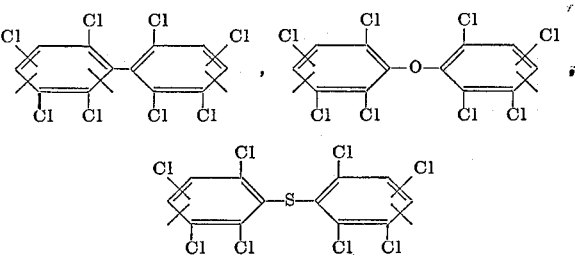

and

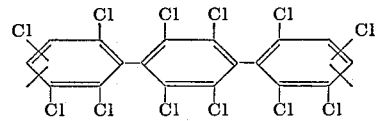

4. The polymer of claim 2 wherein —Ar— is

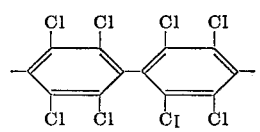

and —A— is —O—.

5. The polymer of claim 1 wherein —Ar'— is selected from the class consisting of

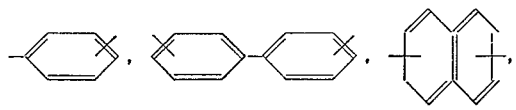

and

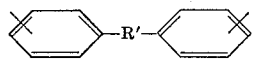

wherein R' is selected from the class consisting of

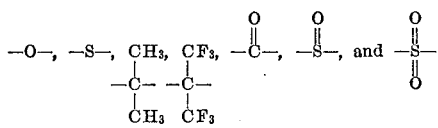

6. The polymer of claim 4 wherein —A— is —O— and —Ar'— is

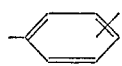

7. The polymer of claim 4 wherein —A— is —O— and —Ar'— is

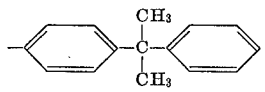

8. The product of claim 1 as a cross-linked polymeric composition.
9. The product of claim 8 as a shaped article.
10. The product of claim 8 as a coating on a substrate.
11. The product of claim 8 as a binder in a shaped article.

References Cited

UNITED STATES PATENTS 3,532,670  10/1970  Schnell et al. _____ 260—49

FOREIGN PATENTS 1,078,234  8/1967  Great Britain.
1,174,954  12/1969  Great Britain.

MELVIN GOLDSTEIN, Primary Examiner

U.S. Cl. X.R.

117—124 E, 132 B; 260—47 R, 49, 79, 79.3 M